US012792697B2

(12) United States Patent
Inoko et al.

(10) Patent No.: US 12,792,697 B2
(45) Date of Patent: Nov. 10, 2026

(54) CONTENT OUTPUT SYSTEM USING NON-FUNGIBLE TOKEN, METHOD, AND PROGRAM

(71) Applicant: TEAMLAB INC., Tokyo (JP)

(72) Inventors: Toshiyuki Inoko, Tokyo (JP); Makoto Kanazwa, Tokyo (JP); Kota Nakano, Tokyo (JP); Tomoki Maekawa, Tokyo (JP)

(73) Assignee: TEAMLAB INC., Tokyo (JP)

( * ) Notice: Subject to any disclaimer, the term of this patent is extended or adjusted under 35 U.S.C. 154(b) by 275 days.

(21) Appl. No.: 18/273,808

(22) PCT Filed: Jun. 3, 2022

(86) PCT No.: PCT/JP2022/022641
§ 371 (c)(1),
(2) Date: Jan. 27, 2025

(87) PCT Pub. No.: WO2023/058269
PCT Pub. Date: Apr. 13, 2023

(65) Prior Publication Data

US 2025/0165565 A1 May 22, 2025

(30) Foreign Application Priority Data

Oct. 8, 2021 (JP) ................................ 2021-166254

(51) Int. Cl.
*G06F 21/10* (2013.01)
*G06Q 20/06* (2012.01)
(Continued)

(52) U.S. Cl.
CPC ...... *G06F 21/1085* (2023.08); *G06F 21/1014* (2023.08); *G06Q 20/06* (2013.01); *G06Q 20/123* (2013.01); *H04L 9/50* (2022.05)

(58) Field of Classification Search
CPC ... H04L 9/50; G06F 21/1085; G06F 21/1014; G06Q 40/055; G06Q 20/02;
(Continued)

(56) References Cited

U.S. PATENT DOCUMENTS 10,348,707 B2 * 7/2019 Ateniese ............... G06F 3/0619
11,973,387 B2 * 4/2024 Naito ....................... H02K 3/34
(Continued)

FOREIGN PATENT DOCUMENTS

JP 2011-86313 A 4/2011
JP 2020-68388 A 4/2020
(Continued)

OTHER PUBLICATIONS

International Search Report issued in WIPO Patent Application No. PCT/JP2022/022641, dated Aug. 30, 2022, along with an English translation thereof.

*Primary Examiner* — Mohammad A Siddiqi
(74) *Attorney, Agent, or Firm* — GREENBLUM & BERNSTEIN, P.L.C.

(57) ABSTRACT

A technology for managing digital content that can be represented in an interactive manner even with the use of an NFT is provided. A content output system includes a user terminal capable of outputting digital content, and a blockchain that holds a non-fungible token (NFT) associated with the digital content. The NFT or a smart contract associated with the NFT includes text data rewritable by an owner of the digital content. The user terminal refers to text data on the blockchain, updates data composing the digital content, and outputs the digital content in which the data is updated.

11 Claims, 10 Drawing Sheets

(51) Int. Cl.
*G06Q 20/12* (2012.01)
*H04L 9/00* (2022.01)

(58) Field of Classification Search
CPC .. G06Q 2220/00; G06Q 50/184; G06Q 30/06; G06Q 30/018; G06Q 20/36; G06Q 20/1235; G06Q 20/123; G06Q 20/06
See application file for complete search history.

(56) References Cited

U.S. PATENT DOCUMENTS

| | | | | |
|---|---|---|---|---|
| 2004/0133794 | A1 | 7/2004 | Kocher et al. | |
| 2007/0033419 | A1 | 2/2007 | Kocher et al. | |
| 2008/0101604 | A1 | 5/2008 | Kocher et al. | |
| 2008/0133938 | A1 | 6/2008 | Kocher et al. | |
| 2008/0137848 | A1 | 6/2008 | Kocher et al. | |
| 2011/0255690 | A1 | 10/2011 | Kocher et al. | |
| 2011/0264923 | A1 | 10/2011 | Kocher et al. | |
| 2020/0005284 | A1 * | 1/2020 | Vijayan | G06Q 20/065 |
| 2020/0372133 | A1 * | 11/2020 | Li | H04L 9/0643 |
| 2021/0133713 | A1 | 5/2021 | Wang et al. | |
| 2021/0266167 | A1 * | 8/2021 | Lohe | H04L 9/3213 |
| 2021/0390161 | A1 | 12/2021 | Nakadaira et al. | |
| 2022/0318399 | A1 * | 10/2022 | Rodler | G06F 21/51 |
| 2023/0024190 | A1 * | 1/2023 | Kai | H04L 9/50 |
| 2024/0013213 | A1 * | 1/2024 | Trock | G06Q 20/401 |
| 2024/0330905 | A1 * | 10/2024 | Kuwata | G06Q 30/0601 |
| 2024/0428027 | A1 * | 12/2024 | Feldman | G06K 7/10366 |

FOREIGN PATENT DOCUMENTS

| | | |
|---|---|---|
| JP | 2021-72116 A | 5/2021 |
| JP | 2021-152887 A | 9/2021 |

* cited by examiner

CONTENT OUTPUT SYSTEM USING NON-FUNGIBLE TOKEN, METHOD, AND PROGRAM

TECHNICAL FIELD

The present invention relates to a content output system, a content output method, and an application program using a non-fungible token (hereinafter referred to as "NFT").

BACKGROUND ART

In recent years, a technology that uses an NFT issued on a blockchain to assign a non-fungible asset value to a digital content, which can be easily copied, has attracted much attention. The owner of the digital content can be proven by the NFT, and it is practically impossible to perjure the NFT. Thus, a digital content to which an NFT is assigned can be bought and sold on a platform of the Internet.

A typical example of the digital content is a digital art. Such digital art has traditionally not been regarded as having asset value like an actual painting because it is easy to copy or tamper with; however, by managing the NFT containing the identification information of the digital art on a blockchain, on which perjury is extremely difficult, it becomes possible to treat the digital art as a unique entity.

A fungible token (FT), such as a crypto asset, is characterized in that it does not have unique identification information, but on the other hand it has fungibility, so that as a result it can be exchanged for other crypto assets or cash. While an NFT is characterized in that it cannot be exchanged with other contents because it contains unique identification information of a digital content, but on the other hand it has non-fungibility, so that as a result it can assign an authenticity to the digital content to prove that the digital content is genuine.

A technology related to asset right of a digital art using an NFT issued on a blockchain is known, for example, from Patent Literature 1. In the system of Patent Literature 1, an asset smart contract corresponding to an asset is issued on a blockchain network in advance, and the asset smart contract is executed to generate a homogenized ownership token (i.e., a fungible token: FT) that indicates the ownership of the asset.

Thereafter, based on the homogenized ownership token (FT), a non-homogenized use right token that corresponds to the homogenized ownership token and that represents the right to use the asset (i.e., a non-fungible token: NFT) is generated. For example, upon receiving the amount of the profit earned from a transaction of the use right token, the asset smart contract transfers the use right token, and calculates a profit-sharing amount and sends it to the person who holds the ownership.

Ethereum is a representative platform for NFT transaction.

CITATION LIST

Patent Literature

[Patent Literature 1] Japanese Unexamined Patent Application Publication No. 2021-72116

SUMMARY OF INVENTION

Technical Problem

However, every copyrighted work, including the digital art, has copyright upon completion of its creation. The copyright includes author's copyright (also referred to simply as copyright) allowed to be assigned to a third party, and author's moral right that are exclusive to the author and cannot be assigned to third parties. A type of the author's moral right is the right of integrity, which gives the author who first created the digital art or the like a legal guarantee that his (or her) copyrighted work not be modified against his (or her) will. Here, generally speaking, the person who holds the author's copyright is referred to as "copyright holder" and the person who holds the author's moral right is referred to as "author". Furthermore, the original or a copy of the copyrighted work can be assigned to a third party while reserving the author's copyright and the author's moral right. The person who has the ownership right of the copyrighted work is referred to as "owner". The terminology used in the description of the present application follows these definitions.

Here, as described above, with the existing NFT technology, by managing an NFT assigned to a digital art on a blockchain, it is possible to manage attribution of the ownership of the digital art without being forged or tampered with by a third party. Thus, it is possible to uniquely identify the current owner or his (or her) account, in addition to the authenticity of the digital art.

On the other hand, some digital arts can change video and/or music output through a display, a projector, or a speaker by interaction with the audience. Such interactivity (interactive nature) is one of the characteristics of the digital art. So far, the applicant of the present application (TeamLab Inc.) has published many digital arts with such interactivity.

Thus, there are many digital arts that are allowed to vary within a range of intention of the author who holds the right of integrity. However, in the existing NFT technology, room for intervention in the digital art by anyone other than the author is severely limited, and more emphasis is placed on attribution of the ownership and assurance of the integrity of the art. Thus, there is a concern that if the digital art is managed using a conventional NFT platform, the artistic expression of the digital art will be constrained, and range of expression will be narrowed. In particular, the applicant of the present application sees the digital art not as a fixed expression object, but as something that shifts with the times and the change of the sentiments of its owner, and such shift is part of the artistic expression that constitutes the digital art.

Therefore, a main object of the present invention is to provide a digital content managing technology that enables interactive expression while using an NFT.

Solution to Problem

The inventors of the present invention have extensively studied the means for solving the above-described problems and, as a result, have devised a mechanism in which rewritable text data is added to an NFT or a smart contract (SC) associated with the NFT; the text data can be freely rewritten by the owner of the NFT, and the owner can modify the digital content with a certain degree of freedom by using the text data as a part of the digital content. Further, the present inventors realized that the problem of the prior art can be solved by the aforesaid mechanism, and completed the present invention. To be specific, the present invention has the following configurations or steps.

A first aspect of the present invention relates to a content output system. The system according to the present invention includes a user terminal and a blockchain. The user terminal is a terminal device capable of outputting a digital content. The digital content means a copyrighted work allowed to be expressed in digital data. Examples of the digital content include, but are not limited to, a still image, a moving image, a music, a text, a game, and a character (including so-called Vocaloid). The blockchain holds an NFT (non-fungible token) associated with the digital content. The blockchain may also hold a smart contract. The blockchain (also called a distributed ledger) is a mechanism that synchronizes the same records among many nodes on a network, and when adding a new record to an existing record, blocks, each serving as a recording unit, are added one after another in a chain-like manner, while succeeding the content (hash) of the immediately preceding block. The NFT is digital data containing identification information of the owner, and is held on the blockchain to thereby assign a proof of ownership impossible to be forged. The smart contract (SC) is a program that is automatically executed according a predetermined rule with a transaction on the blockchain or information taken in from outside the blockchain as a trigger. In the system according to the present invention, the NFT or the SC associated with the NFT further contains text data allowed to be rewritten by the owner of the digital content. The user terminal updates data constituting the digital content with reference to the text data on the blockchain, and outputs the digital content. For example, the user terminal updates the text data of the digital content with reference to the text data on the blockchain. This allows, for example, characters in a still image, characters, music lyrics and/or a text in a moving image, dialogues, scenario and/or a phrase uttered by a character in a game to change according to the text data on the blockchain.

The NFT generally specifies information about the owner; however, in the present invention, in addition to such information, text data possible to be changed by the owner is added to the NFT or the SC. When the text data in the NFT or the SC is changed, the digital content associated with the NFT is also changed. Thus, the owner of the digital content can modify the digital content with a certain degree of freedom. In other words, the copyright holder can assign authority to the owner to modify a part of the digital content. Thus, it is possible to use the NFT to expand the range of expression of the digital content.

In the system according to the present invention, it is preferred that the blockchain holds the NFT and the SC associated with the NFT. In such case, the NFT contains information about the owner of the digital content. The SC contains the text data possible to be rewritten by the owner of the digital content. Thus, by allowing the SC to have the holding function of the text data, it becomes possible to separate and separately manage the market, such as buying and selling the NFT, and the function of the digital content.

It is preferred that the system according to the present invention further includes a content management server that distributes the digital content to the user terminal via a network. The content management server distributes the digital content to the user terminal, so that a plurality of viewers can view the digital content at the same time.

In the system according to the present invention, it is preferable that there are a plurality of user terminals. In such case, the plurality of user terminals include a first user terminal (owner terminal) owned by the owner of the digital content and a second user terminal (viewer terminal) owned by other people. Here, the owner of the digital content can rewrite the text data on the blockchain via the first user terminal. When the text data on the blockchain is rewritten in such a manner, the second user terminal will update data constituting the digital content with reference to the text data. Thus, the digital content output from the second user terminal is updated as needed corresponding to the rewriting of the text data on the blockchain by the first user terminal.

In the system according to the present invention, it is preferred that the blockchain further holds information about an account of the author of the digital content and information about an account of the owner of the digital content. Further, it is preferred that, when the text data on the blockchain is rewritten via the first user terminal, transaction data for moving a predetermined fungible token (FT) from the account of the owner to the account of the author is issued and recorded on the blockchain. In such a manner, the author of the digital content can receive, when the text data of the NFT on the blockchain is rewritten by the owner, a FT (for example, ETH) from the owner as compensation. Thus, the author can receive compensation through the digital content even after the ownership of the digital content has left the author. Similar to a regular NFT transaction, when the ownership of the digital content is transferred, a predetermined compensation can be paid to the author.

A second aspect of the present invention relates to a computer program. The program according to the present invention causes a computer to function as the user terminal in the content output system according to the above-described first aspect. The program according to the present invention can be downloadable to a computer (user terminal) via the Internet, or be recorded on a recording medium such as a CD-ROM, an USB memory or the like.

A third aspect of the present invention relates to a content output method. The content output method according to the present invention is basically performed by the content output system according to the above-described first aspect. In other words, as described above, the content output system includes a user terminal allowed to output a digital content and a blockchain that holds an NFT associated with the digital content. The NFT or the SC associated with the NFT contains a text data possible to be rewritten by the owner of the digital content. In such case, the content output method according to the present invention includes a step in which the user terminal updates the data constituting the digital content by referring to the text data on the blockchain and outputs the digital content with the updated data. The content output method according to the present invention may also include a step in which the user terminal (owner terminal) rewrites the text data on the blockchain.

Advantageous Effects of Invention

According to the present invention, interactive artistic expression can be realized in a digital content managing technology using an NFT.

DESCRIPTION OF EMBODIMENTS

Embodiments of the present invention will be described below with reference to the attached drawings. The present invention is not limited to the embodiments described below, but includes any modifications of the following embodiments as appropriate in the scope obvious to those skilled in the art.

Figure 1:
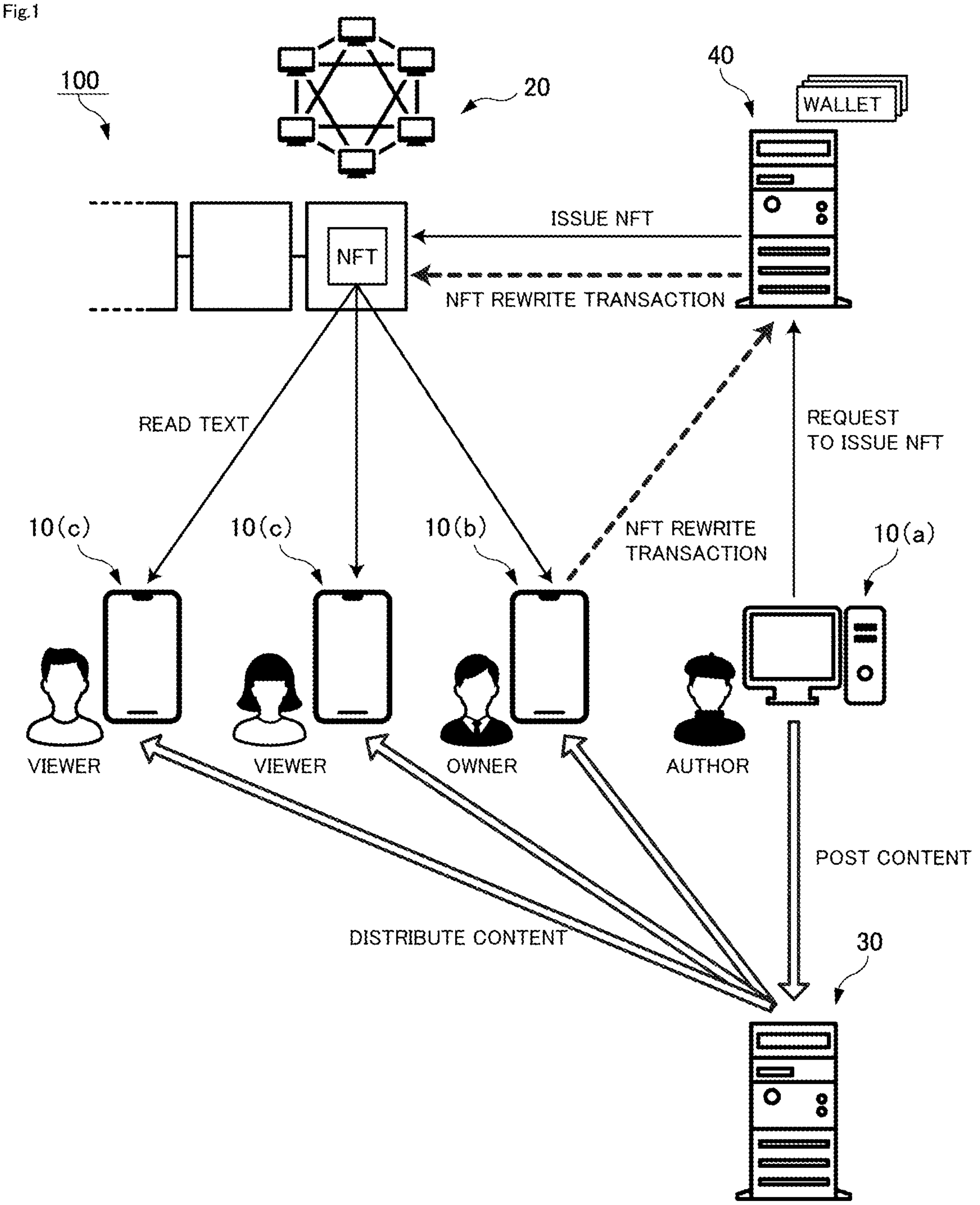
FIG. 1 schematically shows an overall configuration of a system according to a first embodiment of the present invention.

FIG. 1 shows an overall configuration of a system 100 according to a first embodiment of the present invention. In the first embodiment, text data affecting content data is recorded in an NFT. As shown in FIG. 1, the system 100 of the present embodiment includes a plurality of user terminals 10, a blockchain 20, a content management server 30, and an account management server 40. The devices 10, 20, 30, and 40 are connected via a network such as the Internet. The plurality of user terminals 10 are divided into an author terminal 10(*a*), an owner terminal 10(*b*), and viewer terminals 10(*c*) according to the nature of the user who uses the terminal. The author terminal 10(*a*) is a terminal used by an author who created a digital content. The owner terminal 10(*b*) is a terminal used by an owner who currently has the ownership of the digital content. The viewer terminals 10(*c*) are terminals used by viewers who wish to view the digital content. Note that the digital content can also be viewed at the author terminal 10(*a*) and the owner terminal 10(*b*). In the description of the present application, the author terminal 10(*a*), the owner terminal 10(*b*), and the viewer terminals 10(*c*) are also collectively referred to as user terminal 10. For the same reason, the author, the owner, and the viewers are also collectively referred to as user.

First, an overview of the system 100 will be described below with reference to FIG. 1. When the author creates a digital content, he (or she) posts (uploads) his (or her) digital content to the content management server 30 via the author terminal 10(*a*). Further, the author requests the account management server 40 to issue an NFT (non-fungible token) associated with the digital content via the author terminal 10(*a*). The management server 40 creates a wallet containing an account number (public key) and a private key for the NFT corresponding to the digital content requested by the author. Further, the management server 40 requests the blockchain 20 to issue the NFT for the digital content. As described in detail below, the NFT contains text data affecting the digital content, in addition to information about the account number, the title, and the owner of the digital content. The text data is initially set by the author or left blank.

The viewer can use the viewer terminal 10(*c*) to view the digital content recorded on the content management server 30. At this time, the viewer terminal 10(*c*) accesses the blockchain 20 and reads the text data from the NFT assigned to the digital content to be viewed. The viewing target terminal 10(*c*) updates, based on the text data, data constituting the digital content, and outputs the digital content with the updated data. For example, if the digital content is a still image or moving image having characters contained therein, the character part will reflect the text data recorded in the NFT on the blockchain.

Generally, the person who first owns the digital content is the author; however, the ownership of this digital content can be assigned to another person by rewriting the NFT. The example in FIG. 1 shows a state in which the digital content has already been sold, and the ownership of the digital content has been transferred from the author to another person. The owner who currently has the ownership of the digital content can freely rewrite the text data of the NFT assigned to the digital content. To be specific, the owner uses the owner terminal 10(*b*) to make a rewrite request to the account management server 40 to rewrite the text data. The rewrite request contains new text data. Upon receiving the rewrite request, the account management server 40 issues a rewrite transaction of the NFT to the blockchain 20 in the name of the owner. The rewrite transaction is signed with a general public key encryption system, and is verified, on the blockchain 20 side, as having been legitimately issued in the name of the owner.

In such a manner, when the text data of the NFT held by the blockchain 20 is rewritten, the content of the digital content output by the viewer terminal 10(*c*) is also changed. For example, if the digital content is a still image or moving image having characters contained therein, the character part will be replaced by the text data newly recorded in the NFT on the blockchain. Thus, according to the present system, the digital content created by the author will be changed according to the text data arbitrarily set by the owner. The change of the digital content by its owner is also part of the artistic expression by the author. In such a manner, a novel artistic expression using NFT can be realized.

Figure 2:
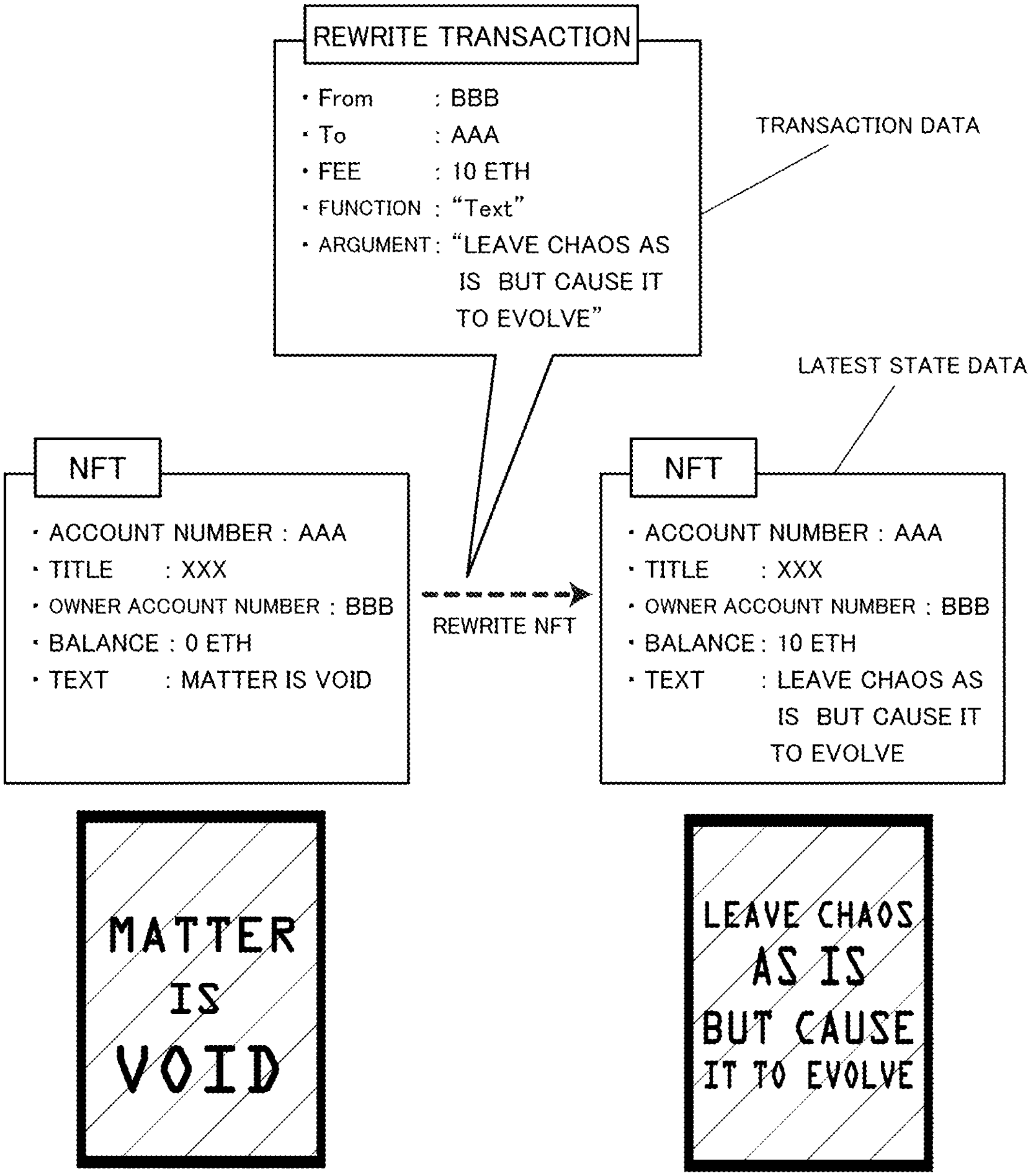
FIG. 2 shows an example of a transaction for rewriting text data of an NFT.

FIG. 2 shows an example of the rewrite transaction of the NFT. In a blockchain such as Bitcoin, transaction data is accumulated in each block. On the other hand, in a blockchains with smart contract function, such as Ethereum, in addition to the accumulation of the transaction data, the latest state data for all NFT accounts is also recorded in each block.

The present invention uses such a blockchain with smart contract function.

As shown in FIG. 2, the NFT assigned to the digital content contains information about, for example, a unique account number (public key), a title, an account number of the owner, a balance, and a text. In the example of FIG. 2, text data "MATTER IS VOID" is recorded in the NFT before rewriting. Thus, the digital content displayed on the viewer terminal 10(*c*) also contains the same characters.

In the example shown in FIG. 2, the account number of the NFT of the digital content is AAA and the account number of the owner of the digital content is BBB. The owner (BBB) has authority to rewrite the text data of the NFT. That is, the owner can issue a transaction for rewriting the text data of the NFT. To be specific, in the example shown in FIG. 2, a rewrite transaction is issued from the account BBB of the owner to the account AAA of the NFT of the digital content. The rewrite transaction shows to pay a fee of 10 ETH and change the text data (function "Text") of the NFT to a new text data "LEAVE CHAOS AS IS BUT CAUSE IT TO EVOLVE" (argument). Thereafter, the rewrite transaction is verified by the blockchain 20, and if the rewrite transaction is authenticated as genuine, the text data of the NFT will be replaced with a new one described in the rewrite transaction. Thus, the latest state data of the rewritten NFT will be held on the blockchain 20. As a result, the digital content displayed on the viewer terminal 10(*c*) is also changed to new characters after the rewriting.

Also, by a program (additional function) set in the NFT, all or part of a fungible token (FT) (for example, 10 ETH) transferred from the owner account to the NFT account in the rewrite transaction may be automatically transferred to the account of the author of the digital content. Thus, the author can be rewarded each time the text data of the NFT is rewritten. Incidentally, all or part of the FT may also be transferred to the account of the operator of the present system.

Figure 3:
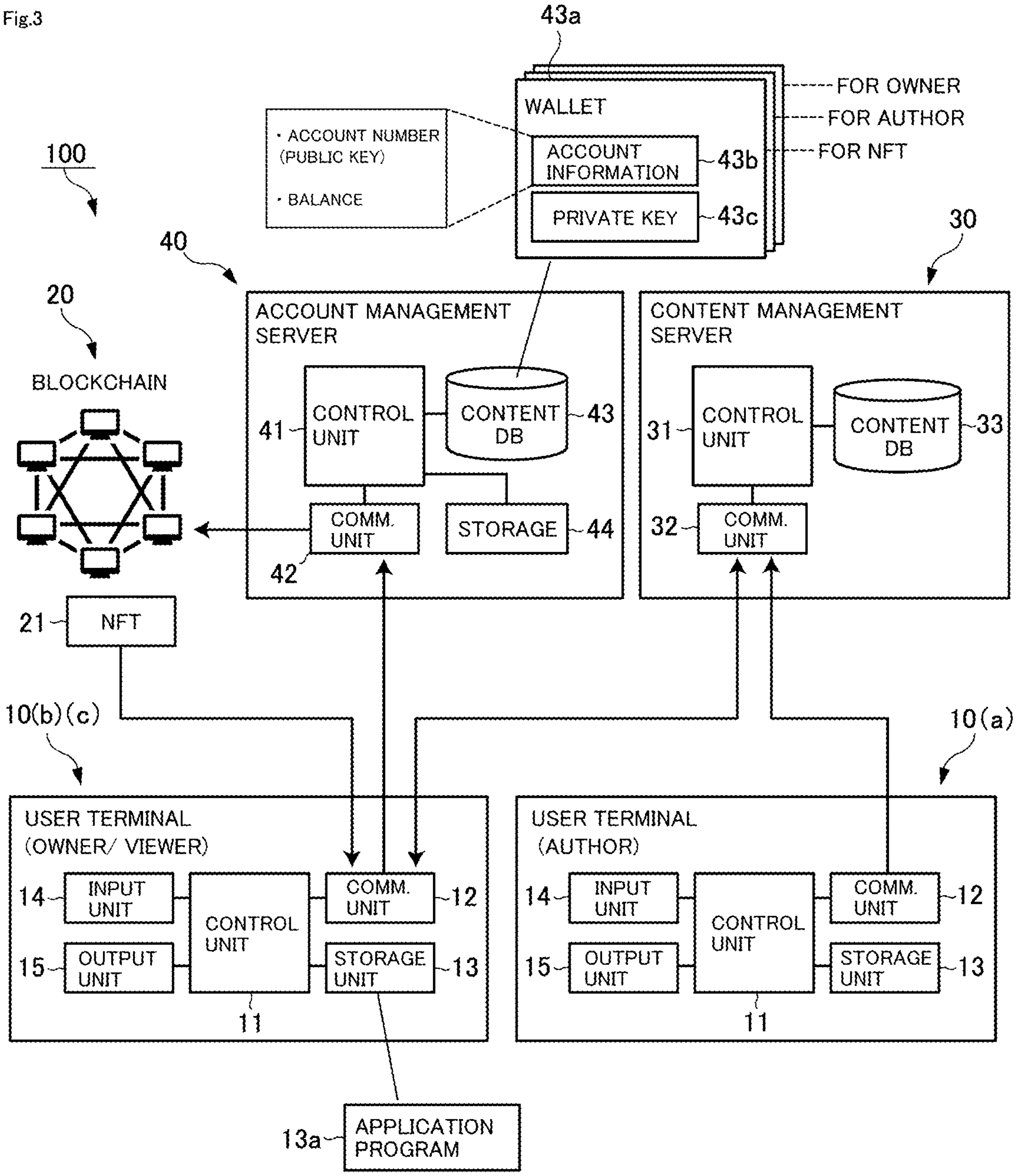
FIG. 3 is a block diagram showing the functional configuration of each device included in the system of the present invention

FIG. 3 shows functional blocks of each device constituting the system 100. Note that, for convenience, in FIG. 3, the user terminal 10(*a*) for the author and the user terminals 10(*b*) and 10(*c*) for the owner or the viewer are drawn separately. However, all of these user terminals 10(*a*)-(*b*) can be realized with a general PC or the like, and have substantially the same functional configuration. For this reason, here the user terminals used by the author, the owner, and the viewer are collectively described as user terminal 10.

The user terminal 10 may be realized by a general PC as described above, or may be a smartphone, a tablet-type terminal or the like. The user terminal 10 has a control unit 11, a communication unit 12, a storage unit 13, an input unit 14, and an output unit 15. FIG. 3 shows the general configuration of the user terminal 10, but the user terminal 10 may also have other configurations that a general smartphone has (for example, cameras and various sensor devices).

The control unit 11 of the user terminal 10 controls the elements 12 to 15 that constitute the user terminal 10. The control unit 11 is composed of a processor such as a CPU, a GPU or the like. The control unit 11 performs control processing of each of the elements 12-15 according to a program stored in the storage unit 13. For example, the control unit 11 temporarily stores a digital content received via the communication unit 12 in the storage unit 13 and outputs an image or sound via the output unit 15. The control unit 11 also communicates with the blockchain 20 via the communication unit 12 to view or acquire the latest state data of the NFT and/or the text data used to modify the digital content of the NFT. The control unit 11 also sends, via the communication unit 12, the predetermined information inputted via the input unit 14 to the account management server 40 and the like. When the user terminal 10 is used by the author, the control unit 11 uploads the digital content created by the author to the content management server 30 via the communication unit 12.

The overall control of the user terminal 10 is performed by the control unit 11.

The communication unit 12 of the user terminal 10 is an element for performing wireless or wire communication with the blockchain 20, the content management server 30, and the content management server 40. For example, the communication unit 12 includes a communication module for performing wireless communication using a known mobile communication standard such as 3G (W-CDMA), 4G (LTE/LTE-Advanced), or 5G via the Internet, and/or a wireless LAN method such as Wi-Fi (registered trademark). The communication unit 12 may also include a communication module in accordance with a known short-range wireless communication standard. An example of the short-range wireless communication standard is Bluetooth (registered trademark). In addition, the user terminal 10 may be configured so as to be able to be connected to the Internet through an optical or telephone line.

The storage unit 13 of the user terminal 10 is an element for storing information used for performing arithmetic processing and the like by the control unit 11 and storing the results of the arithmetic processing. To be specific, the storage unit 13 stores an application program 13*a* that allows the user terminal 10 to perform functions specific to the present invention. In particular, the application program 13*a* is needed to make the user terminal 10 function as an owner terminal 10(*b*) for the owner and a viewer terminal (c) for a viewer. When the user terminal 10 starts the program according to an instruction from the user, the control unit 11 executes processing according to the program. The storage function of the storage unit 13 can be realized by a non-volatile memory such as an HDD or an SSD. The storage unit 13 may also have a function as a memory for writing in or reading out progress of the arithmetic processing by the control unit 11. The memory function of storage unit 13 can be realized by a volatile memory such as a RAM or a DRAM. Further, the storage unit 13 may store ID information (user ID) unique to the user. Further, the storage unit 13 may store an IP address, which is the identification information of the user terminal 10 on the network.

The input unit 14 of the user terminal 10 is an element for inputting predetermined information to the user terminal 10 (especially the control unit 11). The input unit 14 includes an input device mainly for inputting operational information by the user. A known input device, such as a touch panel, a mouse, a keyboard, a trackpad, a stylus pen, a pen tablet or the like, can be used as the input device. The input unit 14 may also include a microphone and/or various sensors such as a camera (CMOS sensor or the like), an acceleration sensor, a gyro sensor, a GPS sensor and/or the like.

The output unit of the user terminal 10 is an element for outputting predetermined information from the user terminal 10. Examples of the output unit 10 include a display device such as a display or a projector, and a sound output device such as a speaker, a headphone, or an earphone. A known display such as a liquid crystal display or an organic EL display can be used as the display. Also, a touch panel display may be configured by placing a touch panel in front of the display.

A known public type blockchain can be used as the blockchain 20. In particular, in the present invention, a blockchain with smart contract function, such as Ethereum, can be preferably used. In the blockchain 20, the same records are synchronized among many nodes on the network. In the embodiment shown in FIG. 1, it is assumed that the account management server 40 functions as one node in the blockchain 20. In the blockchain 20, when adding a new record to existing records, blocks, each serving as a recording unit, will be added one after another in a chain-like manner, while succeeding the data obtained by hashing the content of the immediately preceding block. Such mechanism of the blockchain 20 are known.

Further, an NFT 21 associated with the digital content is held on the blockchain 20. The NFT 21 is issued for each digital content and has the name of the owner of the digital content recorded therein. By holding the NFT 21 on the blockchain 20 where the record is virtually impossible to tamper with, it is possible to prove that the name of the owner of the NFT 21 is genuine. As described above, the NFT21 contains the text data that affects the digital content.

Figure 4:
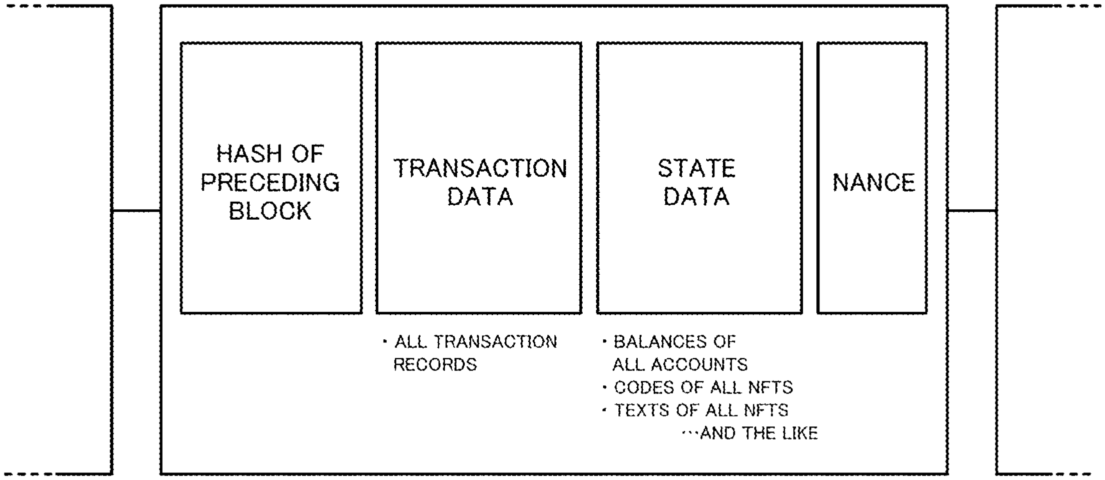
FIG. 4 shows an example of data contained in a block that constitutes a blockchain.

FIG. 4 shows an overview of data contained in a block that constitutes the blockchain 20 in the present invention. A given block mainly contains a hash value of the immediately preceding block, transaction data, state data, and a nance value. The transaction data shows all records of the transaction made during the period of this block. The state data shows the latest state of all accounts managed in the blockchain. The nance value is used to generate, when adding the next block, a hash value that satisfies predetermined conditions from this block. When the nance value is determined, this block is hashed and the hash value is succeeded by the immediately subsequent block. In the latest block, the nance value has not yet been determined, and the transaction data is accumulated until it reaches a predetermined data capacity, and further, the state data is constantly updated to the latest state. In the present invention, in the blockchain with smart contract function, the block contains not only the transaction data but also the state data. The state data typically contains balances of all accounts and program codes of all NFT accounts. The system of the present invention is further characterized in that the state data contains the text data of all NFTs. As discussed above, the text data of the NFT affects the digital content. That is, when outputting the digital content, the user terminal 10 refers to the latest text data of the NFT assigned to the digital content. Further, the user terminal 10 updates, based on the latest text data, the data constituting the digital content, and outputs the digital content with the updated data.

The content management server 30 is a server device on a cloud for managing the digital content created by the author. The content management server 30 includes a control unit 31, a communication unit 32, and a content database 33. The control unit 31 is a processor composed of a CPU or the like, and controls the entire content management server 30. The communication unit 32 includes a communication device and an interface, in which the communication device can be connected to the Internet wired or wirelessly according to a known standard. The content database 33 is a database for storing the digital content created by the author together with related information. For example, in the content database 33, the digital content is stored in association with metadata such as the ID information of the content, the ID information of the author, the name of the author, and the title of the work. In order to associate the digital content with the NFT, it is preferred that, in the content database 33, the ID information of the digital contents and the account number (public key) of the NFT are stored in association with each other. Further, information necessary for managing the digital content and the NFT can be appropriately stored in the content database 33.

The account management server 40 is a server device on a cloud for issuing and managing the account used for the transaction on the blockchain 20. The account management server 40 also functions as one of the nodes that constitute the blockchain 20.

In the present embodiment, the author and the owner need to have an account on the blockchain 20, but the viewer can view the digital content without having an account. In the present embodiment, the account management server 40 is responsible for issuing and managing accounts on behalf of the author, the owners, and the NFT. When issuing and managing the account at the author terminal 10(*a*) or the owner terminal 10(*b*), it is not necessary to use the account management server 40.

The account management server 40 includes a control unit 41, a communication unit 42, an account database 43, and a storage 44. The control unit 41 is a processor composed of a CPU or the like, and controls the entire account management server 40. The communication unit 42 includes a communication device and an interface, in which the communication device can be connected to the Internet wired or wirelessly according to a known standard. The account database 43 stores information about the account used for the transaction on the blockchain 20. Examples of the account include the account of the NFT, the account of the author, the account of the owner and the like. The account is essentially required for holding the ownership of the NFT. The storage 44 is a storage device for providing a storage area for data managed by the blockchain 20 to allow the account management server 40 to function as a node of the blockchain 20. The storage 44 can be realized by an HDD and an SSD.

As shown in FIG. 3, in the account database, account information 43*b* and a private key 43*c* of each user and the NFT are stored in association with each other. In the description of the present application, data including the account information 43*b* and the private key 43*c* is referred to as a wallet 43*a*. In the event of leakage or theft of the wallet 43*a* of each user, the balance of the NF of each user will be moved freely. For this reason, the account management server 40 strictly manages the wallet 43*a* (especially the private key 43*c*) as highly confidential information. At least a unique login ID and password are set in the wallet, and only those who know the login ID and the password can access the wallet. The account information 43*b* contains information such as the account number, the balance and the like. The account number is also used as a public key in a public key encryption system. The wallet 43*a* also contains the private key 43*c*. This private key 43*c* is typically created from the public key (account number) and is paired with the public key. In other words, the private key is used to encrypt (digitally sign) the transaction data by the person who issued the transaction data. The public key is published in the entire blockchain 20 and is used to decrypt the data encrypted (digitally signed) by the private key (verifying the authenticity of the digital signature).

Next, a method of outputting the digital content by the user terminal 10 will be described below with reference to FIG. 5. Note that the digital content can also be viewed from any of the author terminal 10(*a*), the owner terminal 10(*b*), and the viewer terminal 10(*c*). For this reason, the processing at the user terminal 10 is described here without distinguishing between these terminals.

Figure 5:
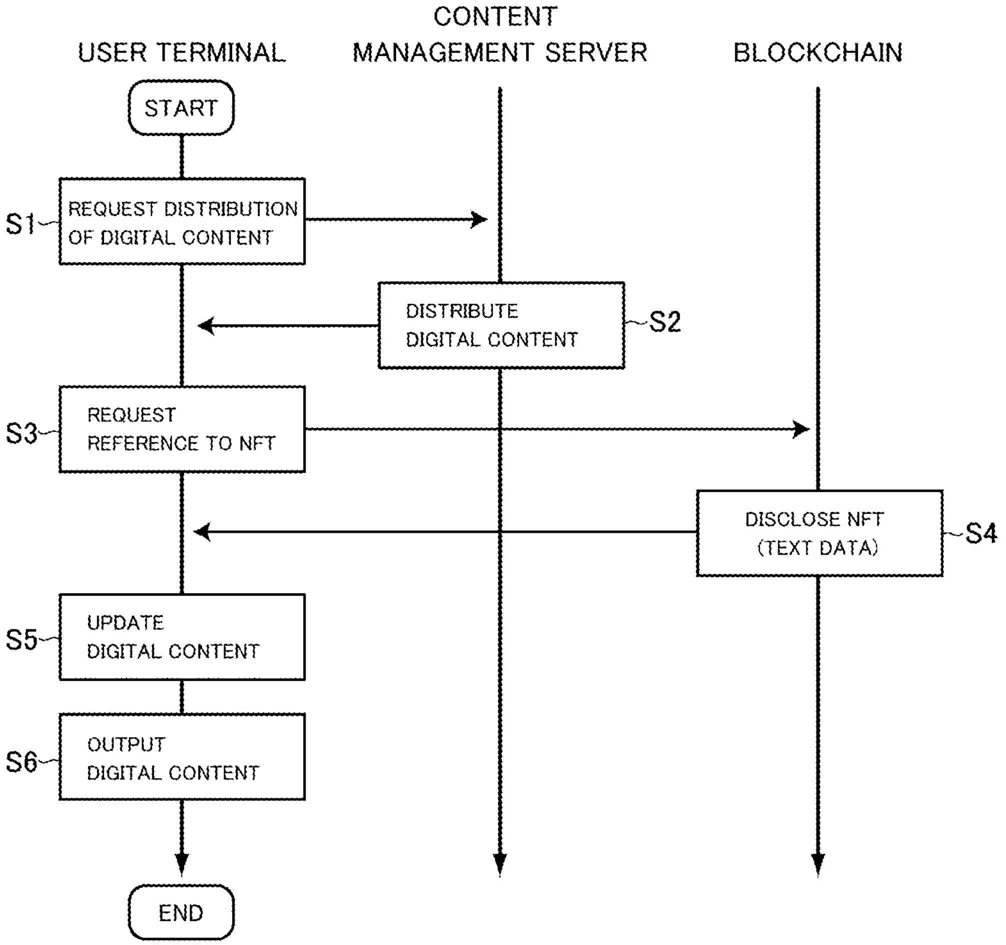
FIG. 5 is a flowchart showing an example of a method of outputting a digital content by a user terminal (viewer terminal).

As shown in FIG. 5, the control unit 11 of the user terminal 10 generates a distribution request of the digital content and sends the generated distribution request to the content management server 30 via the communication unit 12 (step S1). The distribution request of the digital content includes ID information for specifying the digital content. The content management server 30 may provide a website or the like for viewing content to the user terminal 10 and allow the user to specify a digital content he (or she) wishes to view through the website.

When receiving the distribution request of the digital content from the user terminal 10 via the communication unit 32, the control unit 31 of the content management server 30 reads the digital content specified by the request and its metadata from the content database 33. The metadata of the digital content includes, for example, a unique account number of the NFT assigned to the digital content. The control unit 31 distributes, via the communication unit 32, the read digital content and metadata to the user terminal 10 that made the distribution request (step S2).

When receiving the digital content and the metadata from the content management server 30, the control unit 11 of the user terminal 10 temporarily stores these data in the storage unit 13. Thereafter, the control unit 11 of the user terminal 10 requests, via the communication unit 32, the blockchain 20 to refer to the latest state data of the NFT assigned to the digital content (step S3). For example, the user terminal 10 specifies the account number of the NFT of the digital content to the blockchain 20. The blockchain 20 discloses the latest state data of the NFT of the account number specified by the user terminal 10 (step S4). As described above, the text data arbitrarily set by the owner of the digital content is recorded in the state data of the NFT held on the blockchain 20. The user terminal 10 acquires, from the blockchain 20, particularly the text data.

In such a manner, the user terminal 10 acquires the digital content and the text data recorded in the NFT of the digital content. The control unit 11 of the user terminal 10 updates the data constituting the digital content based on the text data of the NFT (step S5). Incidentally, the digital content with the updated data may also be temporarily stored in the storage unit 13. Further, the control unit 11 of the user terminal 10 outputs the digital content with the updated data from the output unit 15 (step S6). For example, if the digital content is a still image or moving image and the image contains character information, the control unit 11 of the user terminal 10 will replace the character information in the still image or the like with the text data acquired from the NFT. Further, the output unit 15 (display) of the user terminal 10 displays the still image with the character information replaced by the text data of the NFT. For example, if the digital content is data of a character that speaks a predetermined phrase (for example, Vocaloid), the user terminal 10 causes the character to speak a phrase corresponding to the text data acquired from the NFT. Alternatively, for example, if the digital content is an RPG game, a character in the game may speak text data acquired from the NFT. Thus, in the present invention, the digital content can be modified in the text data acquired from the NFT. The digital content and the method to modify the digital content are not limited to those described here, and the author may devise and actually create a variety of contents and methods to modify such contents. Therefore, according to the present invention, it is possible to achieve a very high degree of freedom in artistic expression.

Figure 6:
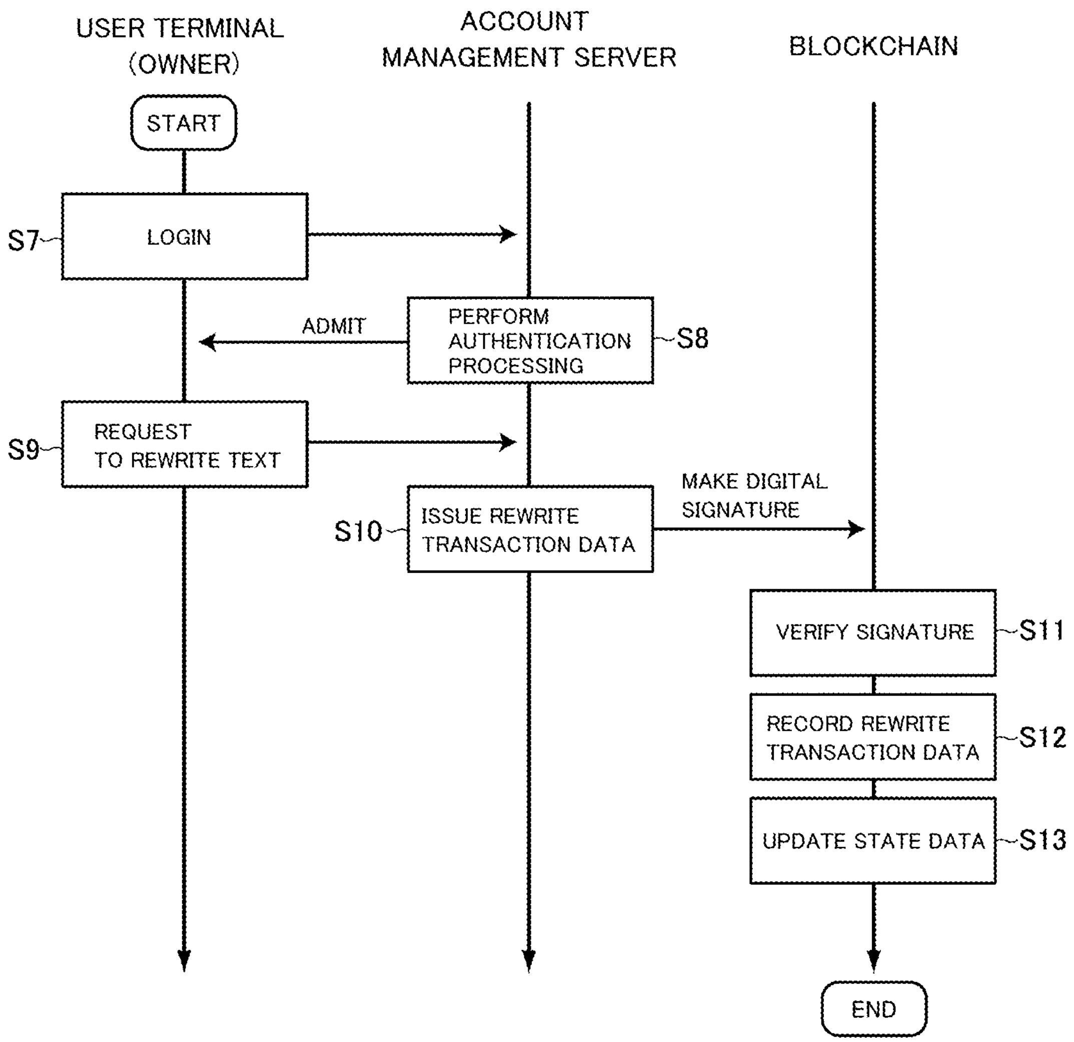
FIG. 6 is a flowchart showing an example of a method of rewriting text data in an NFT.

Next, a method for the owner of the digital content to rewrite the text data of the NFT of the digital content will be described below with reference to FIG. 6. First, the owner uses the owner terminal 10(*b*) to make a login request to access the wallet managed by the account management server 40 (step S7). The login processing can be performed by any known method. To be specific, the owner inputs the login ID and password to the owner terminal 10(*b*). The owner terminal 10(*b*) sends the login ID and password to the account management server 40. The account management server 40 performs authentication processing to determine whether the login ID and password of the owner match the information registered for accessing the wallet (step S8). If the authentication is successful, the account management server 40 allows the owner terminal 10(*b*) to access the wallet.

When the login is completed, the owner inputs a request for rewriting the text data of the NFT assigned to the digital content from the owner terminal 10(*b*). The rewrite request includes the account number of the NFT to be rewritten and new text data. In other words, the owner inputs, via the input unit 14 of the owner terminal 10(*b*), the account number of the NFT he (or she) wishes to rewrite and a text to be newly recorded in that NFT. The control unit 11 of the owner terminal 10(*b*) sends the rewrite request containing the account number of the NFT and the new text data to the account management server 40 via the communication unit 12 (step S9).

The control unit 41 of the account management server 40 receives, via the communication unit 42, the rewrite request from the owner terminal 10(*b*). Further, the control unit 41 of the account management server 40 issues rewrite transaction data for rewriting the text data for the NFT specified by the rewrite request (step S10). An example of the rewrite transaction data is shown in FIG. 2, as discussed above. For example, referring to FIG. 2, the account management server 40 issues transaction data from the account (account number: AAA) of the owner to the account (account number: BBB) of the NFT owned by the owner, in which the transaction data is for rewriting the text data (function “Text”) to a new text data (argument “LEAVE CHAOS AS IS BUT CAUSE IT TO EVOLVE”). Alternatively, the transaction data may incorporate a fee of (10 ETH) for rewriting.

Here, the control unit 41 of the account management server 40 encrypts (digitally signs) the rewrite transaction data with the private key contained in the wallet of the owner. To be more specific, the account management server 40 first generates a hash value (first digest) of the rewrite transaction data and encrypts the generated hash value with the private key. Here, for convenience, the data obtained by encrypting the hash value of the rewrite transaction data with the private key is referred to as digitally signature data. Further, the account management server 40 sends the rewrite transaction data and the digital signature data, as a set, to the blockchain 20.

When receiving the set of the rewrite transaction data and the digital signature data from account management server 40, the blockchain 20 performs processing to verify the authenticity of the digital signature data (step S11). The verification processing may be performed by one or more nodes constituting the blockchain 20. To be specific, the blockchain 20 first generates a hash value (first digest) of the rewrite transaction data. Then the blockchain 20 obtains a value (second digest) obtained by decrypting the digital signature data with the public key (account number) of the owner. Then the blockchain 20 verifies whether the hash value of the rewrite transaction data (first digest) is equal to the value (second digest) obtained by decrypting the digital signature data with the public key of the owner. If the result of the verification shows that the first and second digests are equal, it can be determined that the rewrite transaction data is indeed genuine and issued by the owner.

Thereafter, if the above verification processing has confirmed the authenticity of the rewrite transaction data, the blockchain 20 will record the rewrite transaction data in the latest block (step S12). Note that the transaction data in this block will be stored synchronously in all the nodes that constitute the blockchain 20.

The blockchain 20 updates the state data of the NFT changed by the rewrite transaction (step S13). To be specific, the text data of the NFT was rewritten in the current transaction. Therefore, the text data after rewriting is recorded in the latest state data of the NFT. An example of the state data before and after rewriting is shown in FIG. 2. Whenever outputting the digital content, the user terminal 10 always refers to the latest text data of the NFT assigned to that digital content.

When updating the state data of the NFT, it is also possible to execute the program set in that NFT. For example, when an NF (fungible token) is transferred from the account of the owner to the account of the NFT due to the rewrite transaction of the text data, a part or all of the NF is automatically transferred to the account of the author of the digital content. In the example shown in FIG. 2, 10 ETH is transferred from the account (BBB) of the owner to the account (AAA) of the NFT, and a part or all thereof is transferred from the account of the NFT to the account of the author. Note that even during the transferring, the transaction data is issued for moving the predetermined FT from the account of the NFT to the account of the author. In a blockchain with smart contract function, it is possible to set a predetermined program code in the NFT in such a manner.

Alternatively, banned words is not allowed to be used as text data may be set in the NFT by the author who created the digital content. For example, the blockchain 20 confirms the banned words set in the NFT when updating the state data of the NFT with reference to the rewrite transaction. If the text data recorded in the rewrite transaction contains the banned words, the blockchain 20 deletes or replaces the banned words with other characters, and then updates the state data of the NFT. Alternatively, if the text data recorded in the rewrite transaction contains banned words, the blockchain 20 may not approve the rewrite transaction. When issuing the rewrite transaction, a flow may be added to allow the author to check the rewritten text data. This allows the author to have some control over the text data reflected in his (or her) digital content.

Figure 7:
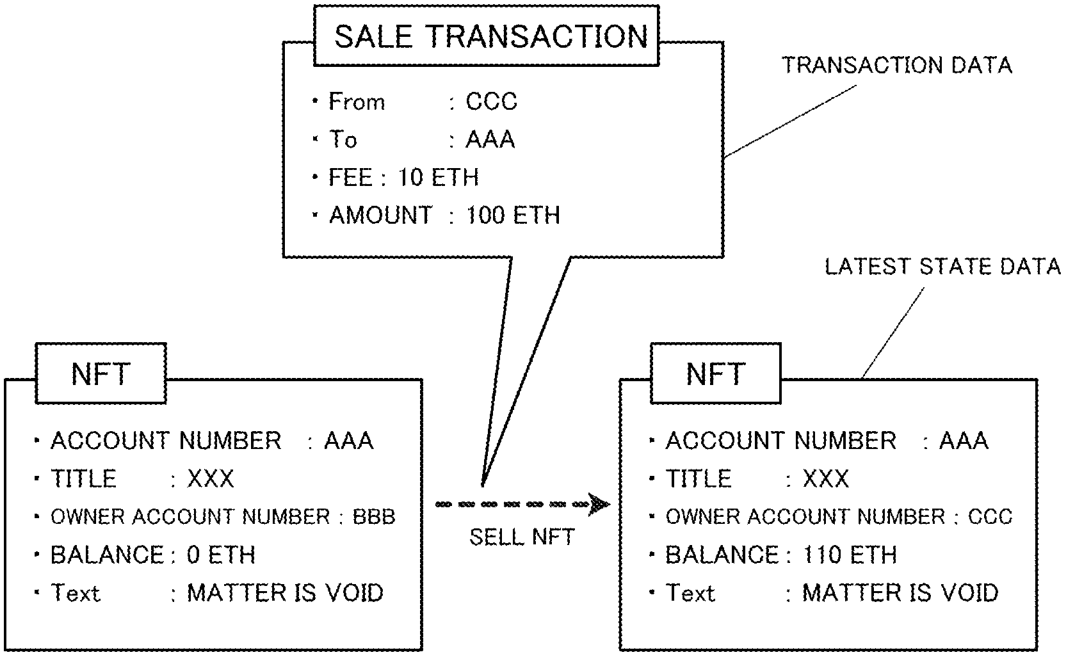
FIG. 7 shows an example of a transaction for selling an NFT.

A sale transaction of the NFT will be briefly described below with reference to FIG. 7. Since sale processing of the NFT is known, the same processing as the known processing can be performed in the present invention. For example, in an example shown in FIG. 7, the owner of the NFT (account number: AAA) of a certain digital content is changed from one user (account number: BBB) to another user (account number: CCC). For example, the current owner (BBB) can freely set the selling price (for example, 100 ETH) of the owner of the NFT. The selling price may also be set automatically according to the market value of the digital content to which the NFT is assigned. In order to purchase the NFT, a prospective purchaser (CCC) of the NFT issues transaction data for paying a fee (10 ETH) and paying the selling price (100 ETH) to the account (AAA) of the NFT. When the sale transaction is verified and authenticated as genuine in the blockchain 20, the owner of the NFT is changed to the prospective purchaser (CCC). The new owner (CCC) of the NFT will have authority to freely rewrite the text data by the above-described flow. Note that the fee and the selling price transferred to the account of the NFT are automatically distributed to the accounts of the operator the system and the original owner (BBB) of the NFT, respectively.

Figure 8:
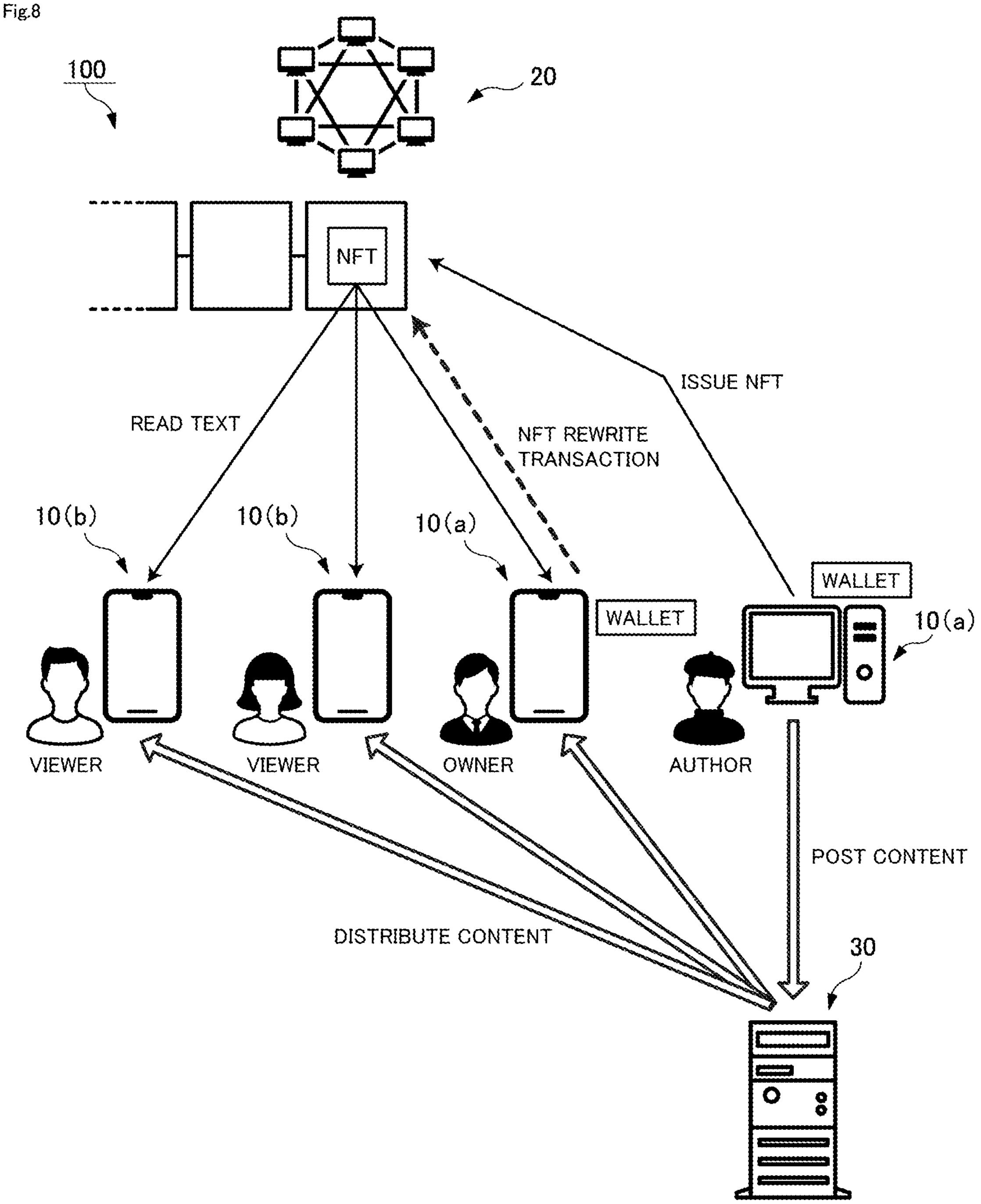
FIG. 8 schematically shows an overall configuration of a system according to a variant of the first embodiment of the present invention.

FIG. 8 shows a variation of the system 100 according to the first embodiment of the present invention. Unlike the embodiment shown in FIG. 1, in the variation shown in FIG. 8, the account management server 40 is omitted. Thus, the author and the owner will manage their own wallets (public key and private key) at the author terminal 10(*a*) and the owner terminal 10(*b*), respectively. The author issues the NFT of the digital content by his (or her) own author terminal 10(*a*) to be held on the blockchain 20. If the owner wants to rewrite the text data recorded in the NFT of the digital content, he (or she) will issue a rewrite transaction by his (or her) owner terminal 10(*b*) and make a request to the blockchain 20 to rewrite the text data. In such a manner, it is possible to omit the account management server 40 by executing processing in which the author terminal 10(*a*) and the owner terminal 10(*b*) directly record the NFT and the transaction data in the blockchain 20. The author terminal 10(*a*) and owner terminal 10(*b*) may each be made to function as one of the nodes constituting the blockchain 20.

Next, a system according to a second embodiment of the present invention will be described below with reference to FIGS. 9 and 10. In the second embodiment, the same configurations as those of the above-described first embodiment are omitted, and description is focused on the configurations that differ from the first embodiment.

Figure 9:
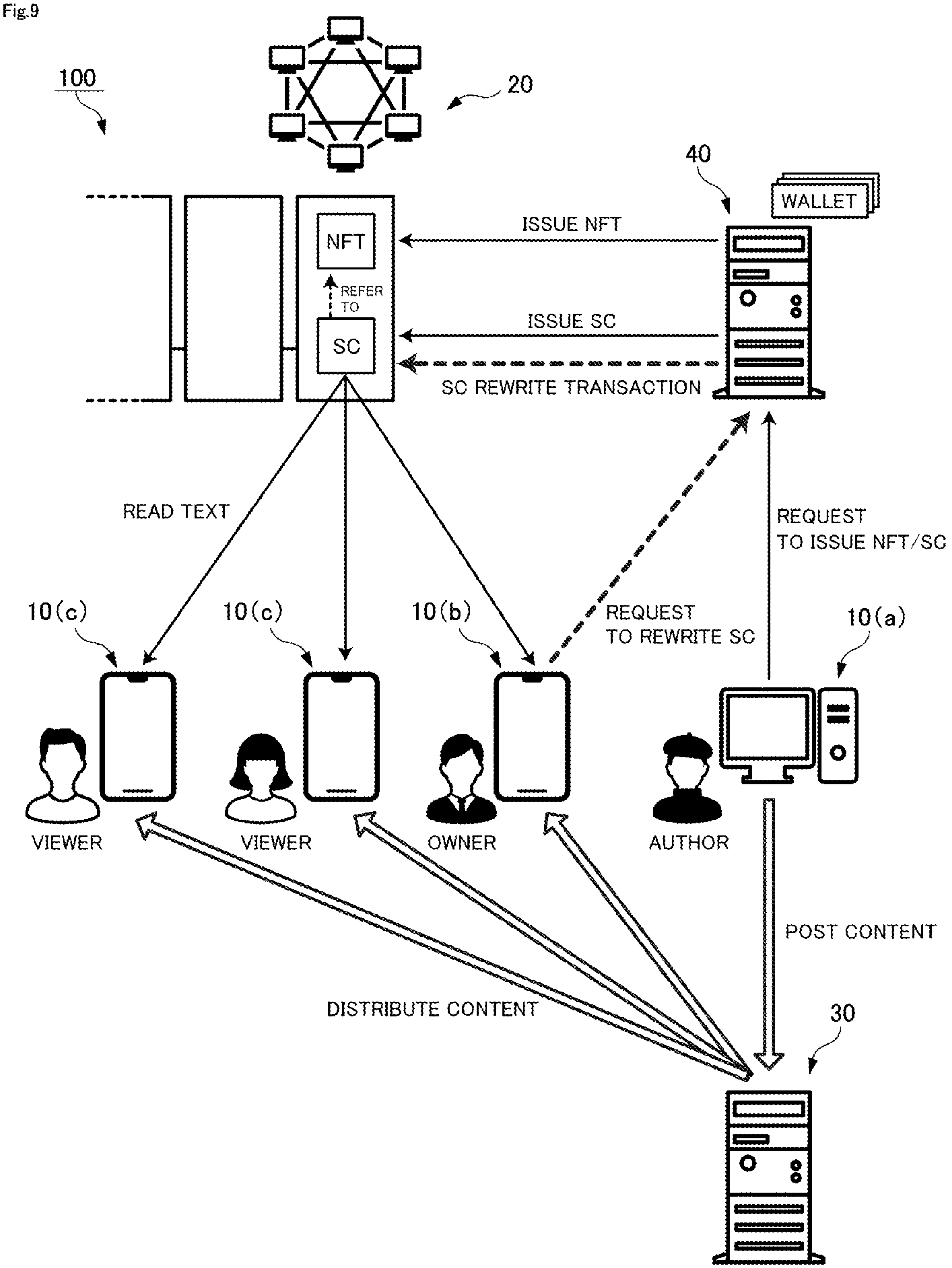
FIG. 9 schematically shows an overall configuration of a system according to a second embodiment of the present invention.
Figure 10:
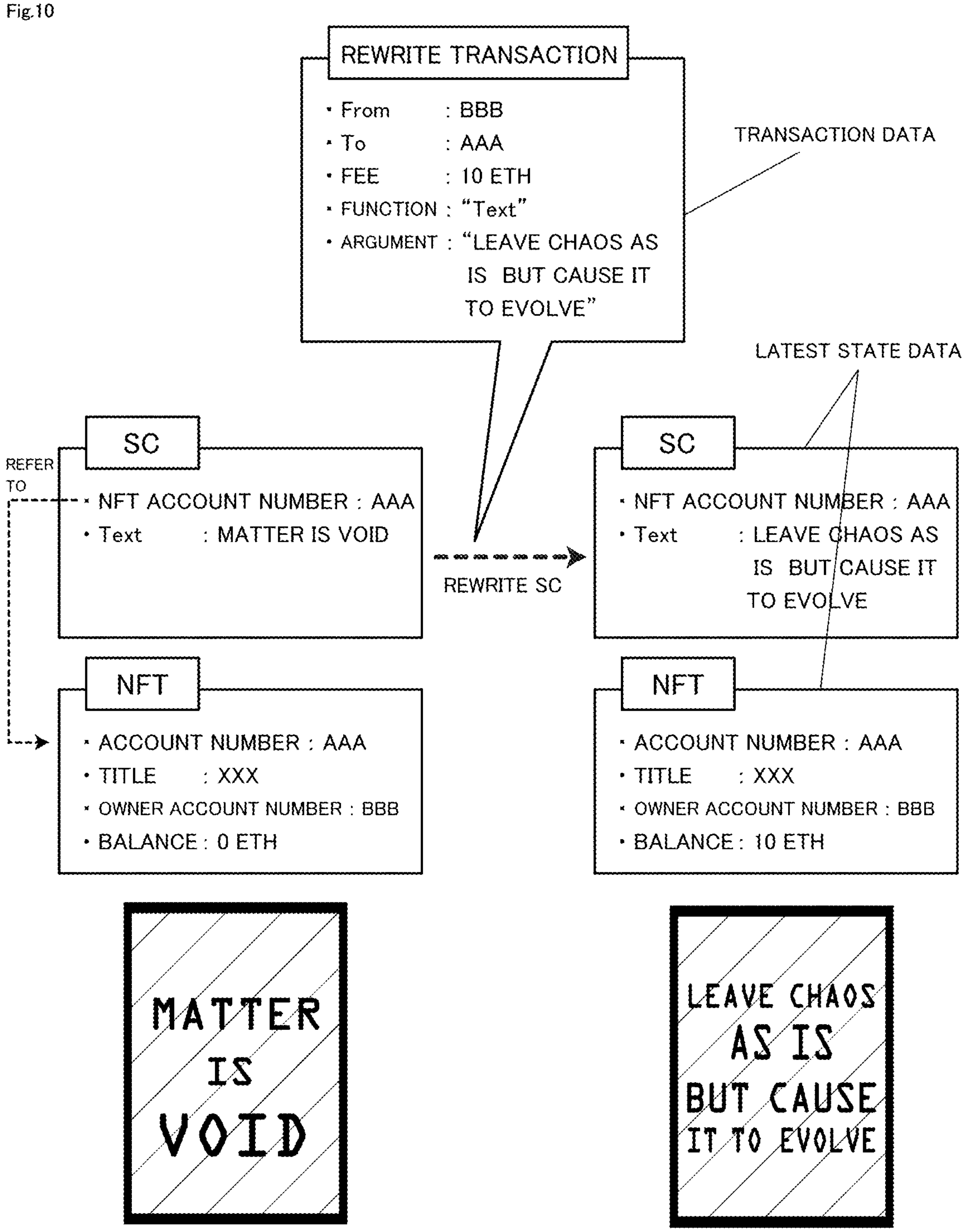
FIG. 10 shows an example of a transaction for rewriting text data of a smart contract.

As shown in FIGS. 9 and 10, in the second embodiment, a smart contract (SC) is issued separately from an NFT on the blockchain 20, and text data affecting the digital content is recorded in the SC. The SC is a program that automatically executes a process according to a predetermined rule on the blockchain, and is used, for example, for automatic fulfillment of contracts. The mechanism of the SC is similar to a vending machine, for example, where when a user inserts coins and presses a button to select a commodity, a sales contract will be concluded and the commodity will be automatically dispensed. In the present embodiment, when the owner of the NFT pays a predetermined fee to a predetermined account and issues a transaction specifying the text data to be rewritten, the text data will be automatically rewritten by the function of the SC.

To be specific, as shown in FIG. 9, when the author creates a digital content, he (or she) posts (uploads) his (or her) digital content to the content management server 30 via the author terminal 10(*a*). Further, the author requests the account management server 40 to issue, via the author terminal 10(*a*), an NFT (non-fungible token) and a SC (smart contract) associated with the digital content. The management server 40 creates a wallet containing an account number (public key) and a private key for the NFT corresponding to the digital content requested by the author. Further, the management server 40 requests the blockchain 20 to issue the NFT for the digital content and the SC associated with the NFT. As shown in FIG. 10, the NFT contains information about the account number, the title, and the owner of the digital content as shown in FIG. 10, for example. The SC contains text data affecting the digital content, as well as the account number of the NFT. Thus, by containing the account number of the NFT in the SC, an association is made between the SC and the NFT. In addition, the conditions for executing the SC can be set by its issuer (specifically, the author) with a certain degree of freedom.

The viewer can use the viewer terminal 10(*c*) to view the digital content recorded on the content management server 30. At this time, the viewer terminal 10(*c*) accesses the blockchain 20 and reads the text data from the SC associated with the NFT assigned to the digital content to be viewed. The viewing target terminal 10(*c*) updates, based on the latest text data recorded in the SC, data constituting the digital content, and outputs the digital content with the updated data.

Similar to the above-described first embodiment, in the second embodiment, the owner who currently has the ownership of the digital content can freely rewrite the text data of the SC associated with the NFT assigned to the digital content. To be specific, the owner uses the owner terminal 10(*b*) to make a rewrite request to the account management server 40 to rewrite the text data of the SC. The rewrite request contains new text data. Upon receiving the rewrite request, the account management server 40 issues a rewrite transaction of the text data to the blockchain 20 in the name of the owner. The rewrite transaction is signed with a general public key encryption system, and is verified, on the blockchain 20 side, as having been legitimately issued in the name of the owner. With the rewrite transaction as a trigger, the SC is executed and the text data recorded in the SC is rewritten.

In such a manner, when the text data of the NFT held by the SC on the blockchain 20 is rewritten, the content of the digital content output by the viewer terminal 10(*c*) is also changed. For example, if the digital content is a still image or moving image having characters contained therein, the character part will be replaced by the text data newly recorded in the NFT on the blockchain.

FIG. 10 shows an example of the rewrite transaction of the SC. As shown in FIG. 10, the NFT assigned to the digital content contains information about, for example, a unique account number (public key), a title, an account number of the owner, and a balance. The SC contains the account number of the NFT and the text data. In the example of FIG. 10, text data "MATTER IS VOID" is recorded in the SC before rewriting. Thus, the digital content displayed on the viewer terminal 10(*c*) also contains the same characters.

In the example shown in FIG. 2, the account number of the NFT of the digital content is AAA and the account number of the owner of the digital content is BBB. The owner (BBB) has authority to rewrite the text data of the SC associated with the NFT. That is, the owner can issue a transaction for rewriting the text data of the SC. To be specific, in the example shown in FIG. 2, a rewrite transaction is issued from the account BBB of the owner to the account AAA of the NFT of the digital content. The rewrite transaction shows to pay a fee of 10 ETH and change the text data (function "Text") of the SC to a new text data "LEAVE CHAOS AS IS BUT CAUSE IT TO EVOLVE" (argument). In other words, the SC confirms, based on the account number (AAA) of the NFT described in the rewrite transaction, whether the account number (BBB) of the owner of the NFT matches the account number (BBB) of the issuer of the rewrite transaction with reference to the NFT with that account number (AAA). If both account numbers match each other, the rewrite transaction can be identified as having been issued by the owner (BBB) of the NFT. Thus, the rewrite transaction is verified by the blockchain 20, and if the rewrite transaction is authenticated as genuine, the text data of the SC will be replaced with a new one described in the rewrite transaction. Thus, the latest state data of the rewritten SC will be held on the blockchain 20. As a result, the digital content displayed on the viewer terminal 10(*c*) is also changed to new characters after the rewriting.

Also, by a program (additional function) set in the SC, all or part of a fungible token (FT) (for example, 10 ETH) transferred from the owner account to the NFT account in a rewrite transaction may be automatically transferred to the account of the author of the digital content. Thus, the author can be rewarded each time the text data of the SC is rewritten. Incidentally, all or part of the FT may also be transferred to the account of the operator of the present system.

In the description of the present application, the embodiments of the present invention have been described as above with reference to the attached drawings in order to express the content of the present invention. However, the present invention is not limited to the above embodiments, and encompasses modifications and improvements obvious to those skilled in the art based on the matters described in the description of the present application.

REFERENCE SIGNS LIST

10 user terminal
10(*a*) author terminal
10(*b*) owner terminal
10(*c*) viewer terminal
20 blockchain
30 content management server
40 account management server
100 system

The invention claimed is:

1. A content output system comprising:

a plurality of user terminals capable of outputting a digital content, and a blockchain holding a non-fungible token (hereinafter referred to as "NFT") associated with the digital content, wherein the NFT or a smart contract associated with the NFT includes text data allowed to be rewritten by an owner of the digital content, the plurality of user terminals includes a first user terminal held by the owner of the digital content and a second user terminal held by other people, when the text data on the blockchain is rewritten via the first user terminal, the second user terminal updates the digital content with reference to the text data on the blockchain, and outputs the digital content, the blockchain holds information about an account of an author of the digital content and information about an account of the owner of the digital content, when the text data on the blockchain is rewritten via the first user terminal, transaction data for moving a predetermined fungible token (FT) from the account of the owner to the account of the author is issued and recorded on the blockchain, and the rewriting of the text changes the digital content of the NFT.

2. The content output system according to claim 1, wherein the blockchain holds the NFT and the smart contract associated with the NFT, the NFT contains information about the owner of the digital content, and the smart contract contains the text data allowed to be rewritten by the owner of the digital content.

3. The content output system according to claim 1, further comprising a content management server that distributes the digital content to the plurality of user terminals via a network.

4. A non-transitory computer-readable medium including a program for causing a computer to function as one of the plurality of the user terminals in the content output system according to claim 1.

5. The content output system according to claim 1, wherein the rewriting of the text changes the perception of the digital content of the NFT when outputted.

6. The content output system according to claim 1, wherein the NFT or a smart contract associated with the NFT includes text data affecting the digital content of the NFT, and the rewriting of the text data changes the digital content of the NFT.

7. The content output system according to claim 1, wherein the digital content of the NFT includes a still image with characters of text therein, music lyrics composed of characters of text, characters of text, a moving image including characters of text, or a game including a character who utters dialogue, a scenario, and/or a phrase, the NFT or a smart contract associated with the NFT includes text data affecting the characters of text in the still image, the characters of text of the music lyrics, the characters of text of the digital content, the characters of the moving image, the utterances of the characters of the game, or the scenario of the game, and the rewriting of the text data changes the characters of text in the still image, the characters of text of the music lyrics, the characters of text of the digital content, the characters of the moving image, the utterances of the character of the game, or the scenario of the game.

8. A content output method performed by a system including a plurality of user terminals capable of outputting a digital content, and a blockchain holding a non-fungible token (hereinafter referred to as "NFT") associated with the digital content, wherein the NFT or a smart contract associated with the NFT includes text data allowed to be rewritten by an owner of the digital content, the plurality of user terminals includes a first user terminal held by the owner of the digital content and a second user terminal held by other people, and the blockchain holds information about an account of an author of the digital content and information about an account of the owner of the digital content, wherein the content output method comprises:

updating with the second user terminal the digital content by referring to the text data on the blockchain, and outputting the updated digital content when the text data on the blockchain is rewritten via the first user terminal, and issuing and recording on the blockchain transaction data for moving a predetermined fungible token (FT) from the account of the owner to the account of the author when the text data on the blockchain is rewritten via the first user terminal, wherein the rewriting of the text changes the digital content of the NFT.

9. The content output method according to claim 8, wherein the rewriting of the text changes the perception of the digital content of the NFT when outputted.

10. The content output method according to claim 8, wherein the NFT or a smart contract associated with the NFT includes text data affecting the digital content of the NFT, and the rewriting of the text data changes the digital content of the NFT.

11. The content output method according to claim 8, wherein the digital content of the NFT includes a still image with characters of text therein, music lyrics composed of characters of text, characters of text, a moving image including characters of text, or a game including a character who utters dialogue, a scenario, and/or a phrase, the NFT or a smart contract associated with the NFT includes text data affecting the characters of text in the still image, the characters of text of the music lyrics, the characters of text of the digital content, the characters of the moving image, the utterances of the characters of the game, or the scenario of the game, and the rewriting of the text data changes the characters of text in the still image, the characters of text of the music lyrics, the characters of text of the digital content, the characters of the moving image, the utterances of the character of the game, or the scenario of the game.

* * * * *